Figure 1:
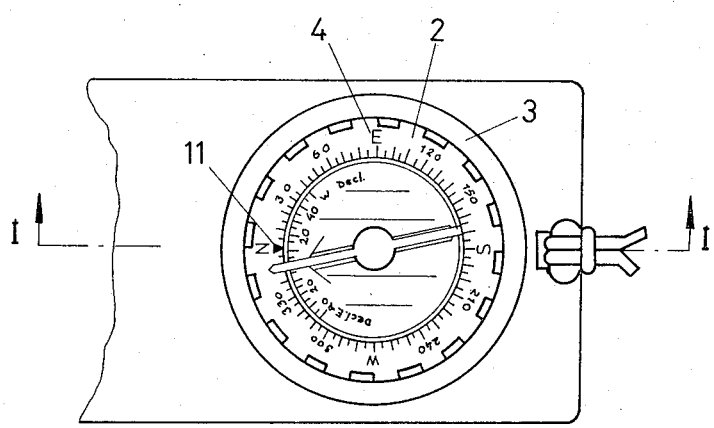

United States Patent [19]
Jarvenpaa

[11] 3,813,792
[45] June 4, 1974

[54] DEVICE FOR DECLINATION CORRECTION OF A MAGNETIC COMPASS

[75] Inventor: Kauko Olavi Jarvenpaa, Helsinki, Finland

[73] Assignee: Suunto Oy, Vanhakartano, Finland

[22] Filed: Nov. 3, 1971

[21] Appl. No.: 195,309

[52] U.S. Cl. ................................................ 33/356
[51] Int. Cl. ............................................. G01c 17/04
[58] Field of Search .......... 33/356, 355 R, 352, 349, 33/334, 272, 275

[56] References Cited
FOREIGN PATENTS OR APPLICATIONS
675,335  7/1952  Great Britain ........................ 33/352
99,350  7/1940  Sweden ................................. 33/349

Primary Examiner—Louis R. Prince
Assistant Examiner—Richard R. Stearns
Attorney, Agent, or Firm—Richards & Geier

[57] ABSTRACT

A device for correcting the declination of a magnetic compass includes a needle box rotatable relatively to a base plate and a concentric declination disk. The device is particularly characterized in that the declination disk turns along with the needle box by friction but that this turning can be prevented by providing a stop which would hold the declination disk but permit the turning of the needle box. The desired declination reading is set on the compass by turning the needle box while holding the declination disk.

1 Claim, 3 Drawing Figures

PATENTED JUN 4 1974   3,813,792

DEVICE FOR DECLINATION CORRECTION OF A MAGNETIC COMPASS

The present invention concerns a magnetic compass consisting of a needle box turnably mounted on a base plate, within which box a magnetic needle has been pivoted and which has been provided with a compass graduation. It is well-known that the needle of a magnetic compass aligns itself with the meridian passing through the magnetic north and south poles and which subtends with the geographical meridian an angle referred to as declination. The aim of the invention is to provide a declination correction device for a magnetic compass, by the aid of which the declination existing at different localities may be set on the compass so that the effect of declination on the directions will be compensated. The declination correction device according to the invention is appropriate for use particularly in connection with cross-country tracking and army marching compasses.

From the Swiss Pat. No. 333,971 a magnetic compass is previously known which has been provided with a declination correction device. This correction device has been formed of a disk provided with a declination index and arranged to be coaxial with the bottom disk of the needle box, provided with a compass graduation. Both disks have been mechanically so arranged that normally they turn along with each other. In order that a given declination might be set on the compass, the disk provided with a declination index has been made to be turnable with reference to the compass graduation disk. These declination correction means are composed so, according to the said patent, that on the rim of the disk provided with a declination index a gear toothing has been provided, which engages with a small pinion, which may be rotated about its axis from outside the compass by the aid of a key to set the prevailing declination on the compass. The object of the present invention is to accomplish a device simpler than this for turning the declination disk with reference to the compass graduation so that the toothing on the outer rim of the declination disk and high precision machined pinion become superfluous. However, setting of declination on the compass by means of a device according to the invention will be a simple and convenient procedure. The invention is mainly characterized in that the declination disk has been provided with a hole, which by turning the needle box is aligned with a hole made in the base plate of the compass and in these aligned holes a stop is inserted, which prevents the declination disk from turning along with the compass graduation and the needle box, whereby the desired declination reading can be set by turning the compass graduation.

Figure 2:
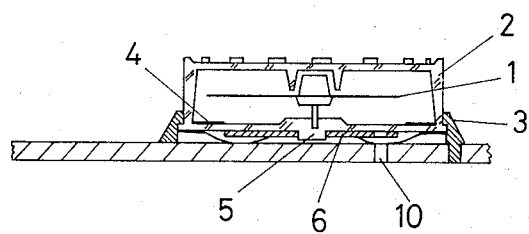
Figure 3:
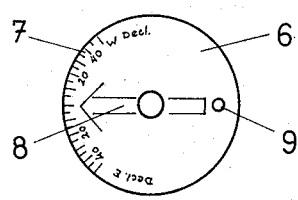

The invention is described in greater detail with reference to the figures in the attached drawing, wherein FIG. 1 shows a compass according to the invention, viewed from above. FIG. 2 shows the section I—I in FIG. 1. FIG. 3 shows the declination disk separately by itself.

In a magnetic compass according to the invention, the needle box 2 housing the magnetic needle 1 has been carried with an appropriate friction fit to be rotatable with the aid of the ring 3 on the base plate. The outer rim of the needle box 2 is knurled in order that it might be easily turnable. The needle box 2, which is an enclosed space filled with an appropriate damping fluid, has been provided with a compass graduation 4 printed on its bottom disk. The transparent bottom disk of the needle box 2 carries centrally a central pin 5, which serves as a journal pin for the declination disk 6. Normally, the declination disk 6 turns along with the bottom disk of the needle box 2, owing to the friction fit between these. The declination disk 6 has been provided with an arrow 8 indicating the range into which the magnetic needle has to be brought and with a declination scale 7, or merely with a declination index, whereby the declination can be set by reference to the compass graduation. According to the invention, a hole 9 has been provided in the declination disk, and the base plate also has a hole 10, both holes being located at the same distance from the central axis of the central pin 5.

A declination correction device according to the invention is used as follows. As is evident from the foregoing, the declination disk 6 will be carried along when the needle box 2 is turned within the ring 3 with reference to the base plate. When the needle box 2 is turned so that the hole 9 of the declination disk 6 coincides with the hole 10 in the base plate, a stop can be inserted in both holes, such as a pencil point or a small pin specifically provided for the purpose in connection with the compass. When the needle box 2 is rotated while the stop is in the holes 9 and 10, the declination disk 6 cannot turn along with it. In this manner the local declination reading, which is found, e.g., in a table or from the map, can be set by turning the reading index 11 on the compass graduation 4 opposite to the "N" symbol to be opposite the point on the declination scale 7 which is consistent with the declination.

I claim:

1. A magnetic compass having a declination correction device comprising:
   a base plate;
   a generally cylindrical compass housing adjustably rotatably mounted on the upper surface of said base plate, at least the top and bottom portions of said housing being transparent, and said bottom portion carrying compass rose indicia;
   the underside of said housing rotatably mounting a declination disk carrying declination indicia thereon, said disk being in frictional engagement with the underside of said housing and in lesser frictional engagement with the upper surface of said base plate, said disk and said base plate being provided with a pair of openings alignable by rotation of the housing and disk relative to the base plate, whereby the declination disk may be rotatably adjusted with respect to said compass housing by inserting an elongated object into both of said openings and rotating said compass housing with respect to said base plate.

* * * * *